(12) United States Patent
Opfer et al.

(10) Patent No.: US 9,127,781 B2
(45) Date of Patent: Sep. 8, 2015

(54) PINCH VALVE

(71) Applicants: Shawn A. Opfer, Elizabeth, PA (US); Jeffrey D. Kerr, Claridge, PA (US)

(72) Inventors: Shawn A. Opfer, Elizabeth, PA (US); Jeffrey D. Kerr, Claridge, PA (US)

(73) Assignee: PBM Valve, Inc., Irwin, PA (US)

( * ) Notice: Subject to any disclaimer, the term of this patent is extended or adjusted under 35 U.S.C. 154(b) by 109 days.

(21) Appl. No.: 13/858,222

(22) Filed: Apr. 8, 2013

(65) Prior Publication Data
US 2014/0299798 A1 Oct. 9, 2014

(51) Int. Cl.
| | |
|---|---|
| F16K 7/06 | (2006.01) |
| F16K 31/122 | (2006.01) |
| F16K 31/143 | (2006.01) |

(52) U.S. Cl.
CPC ............... F16K 31/1221 (2013.01); F16K 7/06 (2013.01); F16K 31/143 (2013.01)

(58) Field of Classification Search
CPC ...... F16K 31/1221; F16K 31/143; F16K 7/06
USPC .............. 251/4, 5, 7, 8, 62, 63, 63.5, 63.6
See application file for complete search history.

(56) References Cited

U.S. PATENT DOCUMENTS

| | | | |
|---|---|---|---|
| 2,908,476 A * | 10/1959 | Hidding | 251/8 |
| 3,491,983 A | 1/1970 | Van Demme et al. | |
| 3,515,367 A * | 6/1970 | Ziaylek, Jr. | 251/9 |
| 4,213,480 A * | 7/1980 | Orum et al. | 137/556 |
| 4,339,897 A | 7/1982 | Thompson et al. | |
| 4,548,382 A | 10/1985 | Otting | |
| 4,635,897 A | 1/1987 | Gallant | |
| 4,776,558 A * | 10/1988 | Bellini | 251/9 |
| 4,925,152 A | 5/1990 | Hueber | |
| 5,445,613 A | 8/1995 | Orth | |
| 6,036,166 A | 3/2000 | Olson | |
| 6,386,505 B2 | 5/2002 | Schoeb | |
| 6,554,589 B2 | 4/2003 | Grapes | |
| 6,695,278 B2 * | 2/2004 | Ellis | 251/5 |
| 6,755,388 B2 | 6/2004 | Furukawa | |
| 6,976,664 B2 | 12/2005 | Welch et al. | |
| 7,104,275 B2 | 9/2006 | Dille | |
| 7,896,310 B2 | 3/2011 | Johansson et al. | |
| 8,087,635 B2 | 1/2012 | Li et al. | |
| 2004/0163711 A1 | 8/2004 | Varone et al. | |
| 2012/0018654 A1 | 1/2012 | Wennberg et al. | |

* cited by examiner

*Primary Examiner* — John Bastianelli
*Assistant Examiner* — Andrew J Rost
(74) *Attorney, Agent, or Firm* — Cohen & Grigsby, PC

(57) ABSTRACT

A pneumatic pinch valve having a main body, a piston supporting a plunger, and a detachable headpiece for receiving a portion of compressible tubing between the plunger and a contoured surface of the headpiece is disclosed. A first safety cap which may restrict access to the plunger when the valve is operated and a manual override handle which may open the plunger are also provided. The pneumatic pinch valve is opened by the injection of gas through an air inlet port to a pneumatic chamber. The headpiece and plunger are configured to compress a portion of flexible tubing in a manner which reduces or eliminates damage to the tubing even after repeated open/close cycles. Further, the pinch valve may be installed onto an existing process system without disruption of fluid flow. Also disclosed is a manual version of the pinch valve.

23 Claims, 14 Drawing Sheets

PINCH VALVE

CROSS-REFERENCE TO RELATED APPLICATIONS

Not Applicable.

STATEMENT REGARDING FEDERALLY SPONSORED RESEARCH

Not Applicable.

THE NAMES OF THE PARTIES TO A JOINT RESEARCH AGREEMENT

Not Applicable.

INCORPORATION-BY-REFERENCE OF MATERIAL ON DISC

Not Applicable.

BACKGROUND

1. Technical Field of the Invention

This invention pertains generally to fluid flow and control using a pinch valve. More specifically, the invention pertains to a pinch valve having an air-to-open pneumatic chamber which is in a closed position at rest, a removable headpiece, and a plunger configured to reduce damage to tubing which is repeatedly pinched in the valve.

2. Background of the Invention

Complex flow control systems are a common element in process and manufacturing systems, particularly in bio-process and bio-manufacturing. In such systems, it is important to carefully control process parameters such as flow rates, temperatures, pH, dissolved oxygen levels, sterility and fluid makeup, to name a few. As such, fluid control systems and valves which can provide rapid and accurate control of fluids in a sterile manner are highly sought after.

Pinch valves are typically a full bore or fully ported type of control valve which uses a pinching effect to obstruct fluid flow in a flexible tube. Such systems require that the tubing in the system is cut or that connections are broken to install the valve in place. Sterility and operation performance are consequently compromised. Further, many pinch valves are controlled by pneumatic means using compressed air to actuate the pinching mechanism and stop fluid flow within the flexible tube. In the event of power failure or loss of air pressure, the failure mode for many such valves is open. For systems which have a closed failure mode, repeated pinching of the flexible tubing frequently leads to tube damage and/or tube breakage. In systems which circulate corrosive or unstable fluids, or when material compatibility or contamination with the product is a factor in the application, both failure modes represent large risks.

Accordingly, there exists a need in the prior art for a pneumatic pinch valve with a pure closed fail mode, which may be installed onto an existing system without breaking any connections, and which may be actuated repeatedly without causing tube damage.

SUMMARY

The presently disclosed invention overcomes many of the shortcomings of the prior art by providing a pneumatic pinch valve which remains in a closed position upon air pressure failure. Further, the pinch valve of the present invention comprises a detachable headpiece which contains a plunger and which may accept a range of tubing sizes. The headpiece and plunger are configured to compress a portion of flexible tubing in a manner which reduces or eliminates damage to the tubing even after repeated open/close cycles. Further, the pinch valve may be installed onto an existing process system without disruption of fluid flow.

Thus, according to its major aspects, and briefly stated, the present invention includes a pneumatic pinch valve for tubing formed of compressible material, wherein the pinch valve comprises: a housing portion having a pneumatic chamber which contains a piston rod, the piston rod having a first piston rod end comprising a plunger and a second piston rod end, wherein the housing portion comprises at least one spring; and a headpiece having a first and second end, and a slot for receiving a portion of tubing formed of compressible material, the first headpiece end is attached to the housing portion so that the plunger resides within the headpiece slot. The headpiece slot includes a surface at the second headpiece end against which the tubing is compressed by the plunger when in a closed position. The spring urges the plunger into the closed position. Further, a gas injected into the pneumatic chamber urges the plunger into an open position by compressing the spring and relieving compression of the tubing to restore the tubing to an open condition. The tubing is removeably held in the headpiece slot by the headpiece surface when the plunger is in the open position, and the headpiece is removeably attached to the housing portion by a clamp.

In embodiments of the pneumatic pinch valve of the present invention, the headpiece surface may be contoured with two concave depressions. Further, the headpiece surface may be contoured with two concentric concave depressions which are perpendicular to one another, wherein one concave depression receives the plunger and the other concave depression receives the tubing.

In embodiments of the pneumatic pinch valve of the present invention, the piston plunger may have a smooth rounded surface which contacts the headpiece surface and has a diameter substantially the same as the diameter of the headpiece surface.

In embodiments of the pneumatic pinch valve of the present invention, the pinch valve may further comprise a manual override handle rotatably attachable to the second piston rod end by an internally threaded bore, the second piston rod end comprising a matching screw thread, wherein rotation of the manual override handle on the second piston rod end compresses the spring urging the plunger into the open position.

In embodiments of the pneumatic pinch valve of the present invention, the pinch valve may further comprise a first safety cap securable over the headpiece, wherein a closed position of the first safety cap deters access to the headpiece slot. The first safety cap is rotatable to an open position which allows access to the headpiece slot. Further, the pneumatic pinch valve may comprise a second safety cap securable over at least a portion of the housing portion, wherein the second safety cap restricts access to the piston rod and all or a portion of the manual override handle.

In embodiments of the pneumatic pinch valve of the present invention, the housing portion may further comprise a port for a limit switch which detects a position of the plunger. Additionally, the housing may be constructed of two parts that are detachable to allow access to the spring. Moreover, the spring may be a set of nested springs.

The present invention further includes a pinch valve for tubing formed of compressible material comprising:

a main body portion having first and second main body portion ends, a lateral bore, and a laterally extending main body cavity, the main body cavity comprising first and second cavity ends and an air inlet port disposed within the second cavity end;

a piston rod having first and second rod ends, the piston rod comprising a piston plate disposed about a middle portion of the piston rod and a piston plunger disposed at the second rod end, wherein the piston rod is slidably mounted within the main body cavity so that the piston plate forms a pneumatic chamber therein and the piston plunger extends beyond the second main body portion end;

at least one spring disposed within the main body cavity and positioned between the first main body cavity end and the piston plate to bias the piston plate into a closed position against the second main body cavity end; and a headpiece having a headpiece slot for receiving a portion of tubing formed of compressible material, the headpiece attachable to the second body end so that the piston plunger resides within the headpiece slot, the headpiece slot including a headpiece surface against which the tubing is compressed by the piston plunger when the piston plate is in the closed position, wherein a gas injected through the air inlet port into the pneumatic chamber pushes the piston plate into an open position by compressing the spring and relieving compression of the tubing to restore the tubing to an open condition.

In embodiments of the pinch valve of the present invention, the piston plunger may have a smooth rounded surface which contacts the headpiece surface and has a diameter substantially the same as the diameter of the headpiece surface. Further, the headpiece surface may be contoured with two concentric concave depressions which are perpendicular to one another, wherein one concave depression receives the plunger and the other concave depression receives the tubing. The piston plate and piston rod may additionally comprise gaskets to provide an air tight seal within the main body cavity.

In embodiments of the pinch valve of the present invention, the pinch valve may further comprise a manual override handle rotatably attachable to the first rod end by an internally threaded bore, the first rod end comprising a matching screw thread, wherein rotation of the manual override handle on the first rod end compresses the spring urging the piston plate into the open position. In addition, the pinch valve may further comprise a first safety cap securable over the headpiece, wherein a closed position of the first safety cap deters access to the headpiece slot, and a second safety cap securable over at least a portion of the housing portion, wherein the second safety cap restricts access to the piston rod and a portion or all of the manual override handle.

The present invention further includes a manual pinch valve for tubing formed of compressible material comprising:

a main body having a laterally extending main body cavity and a transverse tube holding slot for receiving a portion of tubing formed of compressible material;

a piston rod having a first and second end, wherein the first piston rod end comprises a plunger, wherein the piston rod is slidably mounted within the main body cavity so that the plunger extends into the tube holding slot; and a handle rotatably attachable to the main body at an end opposite from the tube holding slot, the handle having an internally threaded bore which matches an external thread on the main body end, wherein rotation of the handle urges the plunger toward or away from a contoured surface of the tube holding slot thereby compressing or decompressing the tubing.

In embodiments of the manual pinch valve of the present invention, the plunger may have a smooth rounded surface which contacts the contoured surface of the tube holding slot and has a diameter substantially the same as the diameter of the contoured surface. Further, the contoured surface of the tube holding slot may be contoured with two concentric concave depressions which are perpendicular to one another, wherein one concave depression receives the plunger and the other concave depression receives the tubing.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale.

DETAILED DESCRIPTION

Figure 1:
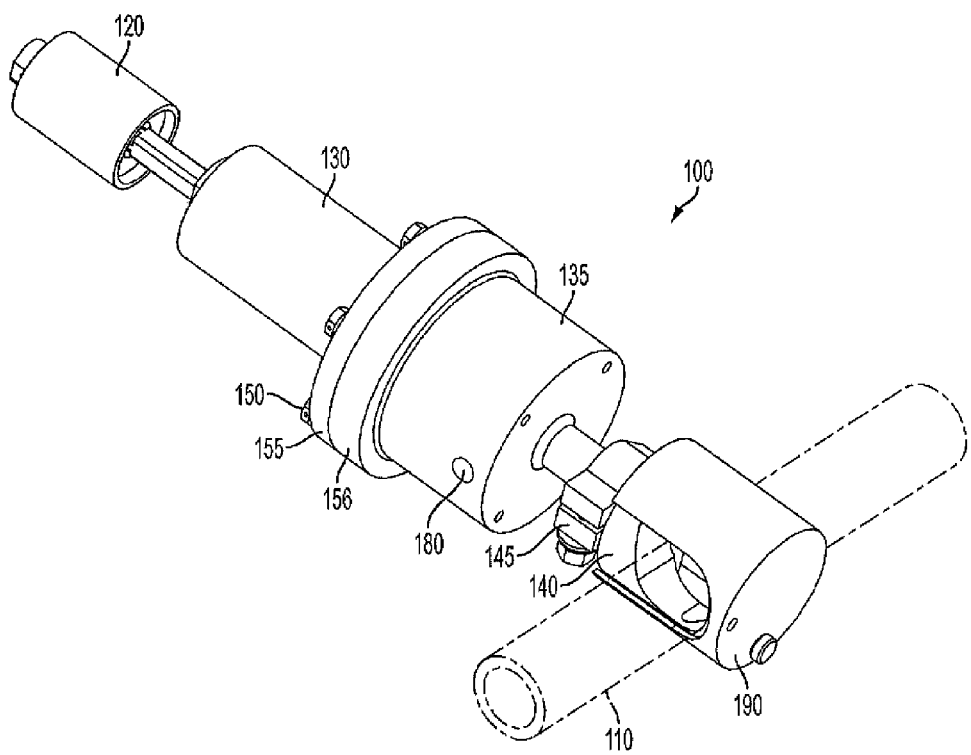
FIG. 1 illustrates a perspective view of a pneumatic pinch valve in the open position in accordance with certain aspects of the present invention including a compressible tubing.

In the following description, the present invention is set forth in the context of various alternative embodiments and implementations involving a pinch valve for tubing formed of compressible material. A unique design for the tube pinching mechanism reduces or eliminates tube damage after repeated open/close cycles. The pinch valve may be pneumatically or manually operated. The pneumatically operated pinch valve affords a pure fail closed state in the event of pressure loss to the pneumatic chamber.

Various aspects of the pinch valve may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the pinch valve in addition to the orientation depicted in the drawings. By way of example, if aspects of the pinch valve shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

Referring now to the drawings, embodiments of a pneumatic pinch valve of the present invention are shown in FIGS. 1-8 generally designated by the reference numeral 100. FIG. 1 illustrates a rear perspective view of an embodiment of a pneumatic pinch valve of the present invention. The pinch valve 100 includes a main body (130, 135), a manual override handle 120 and a headpiece 140. A portion of flexible, compressible tubing 110 is held in the headpiece 140. The headpiece 140 may be removeably attached to the main body part 135 by a clamp 145. Furthermore, the main body may be comprised of two parts (130, 135) that may be brought together at a joint (155, 156) and connected by bolts or screws 150. Also shown is a first safety cap 190 and an air inlet port 180.

Figure 2:
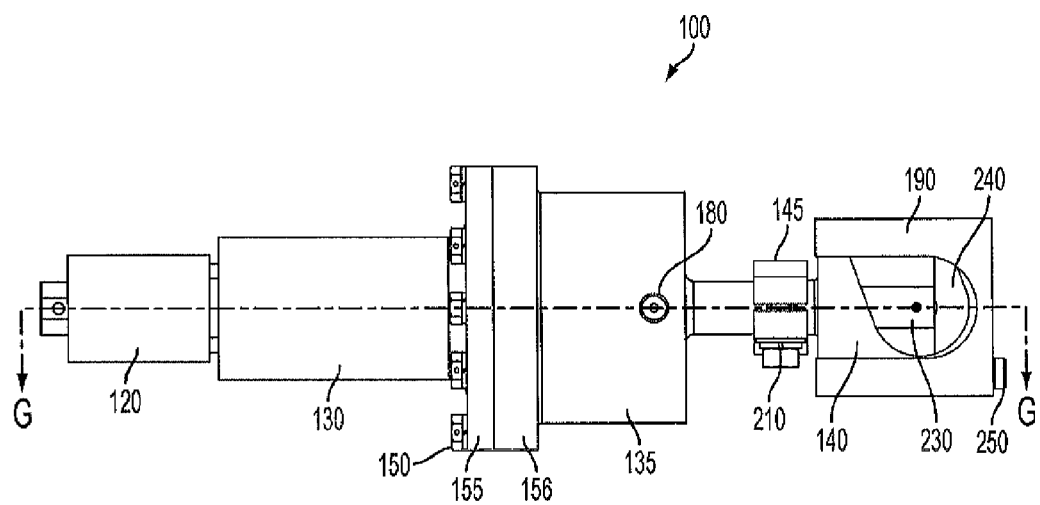
FIG. 2 illustrates a side view of a pneumatic pinch valve in accordance with certain aspects of the present invention.

FIG. 2 shows a side view of an embodiment of a pneumatic pinch valve of the present invention in the closed position. Shown are the manual override handle 120, the main body (130, 135), the headpiece 140, and the clamp 145 which attaches the headpiece 140 to the main body part 135. From this perspective, the tubing would be coming out of the page. Also shown for reference are the joints (155, 156) on the main body parts (130, 135) which may be connected by bolts or screws 150. While the main body (130, 135) is shown to comprise two separate body parts or segments, other configurations are within the scope of the present invention. For example, the main body could be configured to include three or more parts or segments. Furthermore, while the joints (155, 156) at which the two main body parts (130, 135) are connected are shown to be located at a middle portion of the main body, other configurations are possible. For example, the main body may be configured to include one part and an end cap, such that the joint at which the two main body parts are connected resides at an end of the main body.

Also shown in FIG. 2 is the air inlet port 180 which may be located on a side of the main body part 135. The air inlet port 180 may be attached to a supply of air or other gas via a solenoid valve. A plunger 240 is shown attached to a second end of a piston rod 230, both of which are shown to reside within a slot in the headpiece 140. The first safety cap 190 may be attached to the headpiece 140. As shown in FIG. 2, the first safety cap 190 is in a closed position so that access to the headpiece slot and the plunger 240 within the headpiece slot is restricted or discouraged. The first safety cap 190 may be rotated 90° to an open position to allow access to the headpiece slot and the plunger 240. The first safety cap 190 may be attached and held in place by a screw 250 in either the open or closed position. In certain embodiments, the headpiece 140 and first safety cap 190 may be configured to maintain a secure connection that does not require the screw 250. In such a configuration, the first safety cap 190 may be able to rotate to open and closed positions and may be removable.

FIG. 2 also shows a screw 210 which may be tightened to hold the clamp 145 in a locked position and thus may securely attach the headpiece 140 to the main body part 135. The headpiece 140 may be configured to accept flexible tubing of various diameters. In the event that a tubing diameter exceeds or deceeds a diameter which the headpiece 140 can accept, a larger or smaller headpiece may be attached to the main body (130, 135) of the pinch valve 100.

Figure 3A:
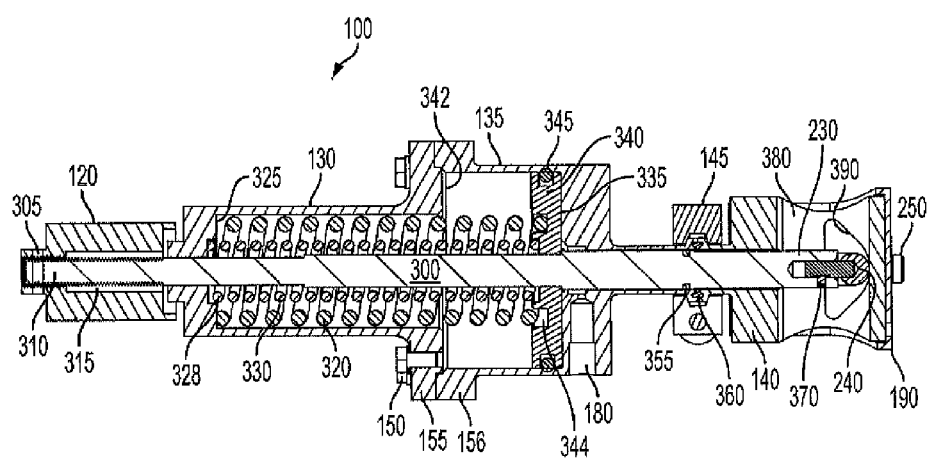
FIG. 3A illustrates a sectional view of the pneumatic pinch valve shown in FIG. 2 in the closed position in accordance with certain aspects of the present invention.

FIG. 3A shows a sectional view of the pinch valve 100 taken along line G-G as shown in FIG. 2. The manual override handle 120, main body (130, 135), clamp 145, and headpiece 140 are pointed out for reference. The main body (130, 135) is shown to have a central lateral bore which encloses a piston rod 300. A first end 310 of the piston rod 300 exits an end of the main body part 130 and may be rotatably attached to an internally threaded bore 305 on the manual override handle 120 by a set of matching external threads 315 on the first piston rod end 310. The second end 230 of the piston rod 300 may exit an end of the main body part 135. This second piston rod end 230 may have the plunger 240 attached. The plunger 240 may be integral to the piston rod 300 or may be removeably attached by the use of at least one set screw 370. Also shown is a piston plate 340 which is integral to and disposed about a middle portion of the piston rod 300.

In certain embodiments, the piston rod 300 may be configured to comprise a square section which may fit through the central bore in the main body (130, 135). As shown in FIG. 3A, this square section is a small portion of the piston rod 300 which fits through an opening at the end of the main body part 130. Such a configuration may restrict rotation of the piston rod 300 within the main body (130, 135) so that the plunger 240 is held in a specific orientation with respect to the headpiece 140. While the piston rod 300 is shown to comprise only a small square section in FIG. 3A, other configurations are within the scope of the present invention. For example, the entire piston rod 300 may be square except for the small portion at the first end 310 which comprises the external threads 315 that accept the manual override handle 120.

The main body (130, 135) is shown to have a lateral central cavity communicated with the central bore. A set of springs (320, 330) are shown which reside within the central cavity and are disposed between a first end of the cavity 325 and the piston plate 340. These springs (320, 330) provide tension on the piston plate 340 and urge the plate into a closed or resting position against a second end of the central cavity 335. The springs are shown as a set of nested springs, with a smaller inner spring 330 and a larger outer spring 320. The inner diameter of a portion of the cavity may match the outer diameter of the larger spring 320. Further, an indentation or groove 344 may be formed in the piston plate 340 that may hold an opposite end of the larger spring 320 in position. Indentation 328 in the first end of the cavity 325 and a similar indentation in the piston plate 340 may be used to hold the smaller spring 330 in position. While the piston valve 100 of the present embodiment is shown to have a set of nested springs, other configurations are within the scope of the present invention such as, for example, a single spring. Furthermore, other means for placement of the springs such as, for example, raised regions, ridges or tabs, are within the scope of the present invention.

The main body joints (155, 156) are shown as well as the screws or bolts 150 which attach the two parts. The main body (130, 135) has been configured to comprise an increased diameter for the central cavity at an end closest to the headpiece 140 which encloses the piston plate 340. In this embodiment, the piston plate 340 may move between the second cavity end 335 and a stop point 342, such as the point at which the increased diameter of the cavity ends. While the piston valve 100 is shown to include a cavity comprising various diameter regions as defined by the various main body parts (130, 135), other configurations are within the scope of the present invention.

Figure 3B:
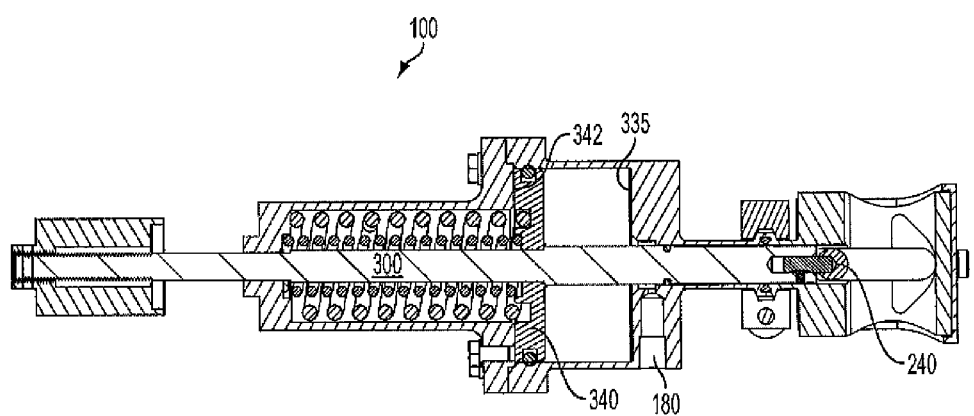
FIG. 3B illustrates a sectional view of the pneumatic pinch valve shown in FIG. 2 in the open position in accordance with certain aspects of the present invention.

The air inlet port 180 is shown in the main body part 135 to be in fluid communication with the central cavity. Air or another gas injected into the central cavity through the air inlet port 180 may urge the piston plate 340 toward the stop point 342, compressing the springs (320, 330) and placing the piston rod 300 in an open position, as is shown in FIG. 3B. A piston plate gasket 345 and a piston rod gasket 355 are included to provide a gas tight seal within the chamber, referred to herein as a pneumatic chamber. The tension of the springs (320, 330) and the pressure of the air injected to the pneumatic chamber are balanced to allow for complete movement of the piston plate 340 against the stop point 342. In other words, in the event that an increased or decreased gas pressure is provided to the pinch valve 100 through the air inlet port 180, the springs (320, 330) may be exchanged to balance the gas pressure. The springs (320, 330) may be of any size and/or number to achieve the required pressures. Further, the main body parts (130, 135) may be detached to allow access to the springs (320, 330) by removing the screws or bolts 150 which attach the main body parts at the joints (155, 156).

A slot 380 in the headpiece which is configured to accept a piece of flexible tubing (perpendicular to the piston valve 100) is also depicted in FIG. 3A. This slot 380 contains the piston plunger 240 and a surface 390 against which the plunger resides when the piston 300 is in the closed or resting position. As discussed above, when no air or gas is injected through the air inlet port 180, the tension of the springs (320, 330) urges the piston plate 340 against the second end of the central cavity 335, thus pushing the plunger 240 into the closed position against the surface 390 of the headpiece 140. When air or another gas is injected through the air inlet port 180, the piston plate 340 is urged toward the stop point 342, and the plunger is pushed away from the surface 390 of the headpiece 140 and into the open position.

Factors that may influence the selection of spring size, tension and number, beyond the gas pressure provided at the gas inlet port 180, include the size, diameter, thickness and compressibility of the flexible tubing on which the pinch valve of the present invention will be used. For example, if large diameter tubing having a low degree of compressibility is to be used in the pinch valve, an increased spring tension may be required to completely compress the tubing between the surface 390 of the headpiece 140 and the plunger 240. If, on the other hand, very flexible tubing is to be used, the spring tension may be lowered, or fewer springs may be installed, so that the tension on the tubing when the plunger 240 is in the closed position does not damage or break the tubing.

The manual override handle 120 may be rotatably attached to the first piston rod end 310 as described above. Rotation of the manual override handle 120 (threaded portion 305 of the manual override handle 120 on the threaded portion 315 of the first piston rod end 310) pulls the piston rod 300 through the internal bore of the main body (130, 135) so that the plunger 240 is moved away from the surface 390 of the headpiece 140 and into the open position. Thus, the manual override handle 120 may be used to open the pinch valve 100, and may also provide a means to change the tension of the springs (320, 330) and thus reduce pressure on tubing in the pinch valve. Further, the manual override handle 120 provides a means to partially open the pinch valve 100, thus allowing partial flow through a flexible tubing installed in the headpiece 140. Actuation of the pinch valve may then provide two different flow rates rather than a pure on/off of the flow rate.

Also shown in FIG. 3A is a gasket 360 that is provided at the connection point between the main body part 135 and the headpiece 140. This gasket may aid in securely attaching the headpiece 140 to the main body part 135 (by clamp 145) while maintaining the piston rod 300 in a slideable state within the central bore of the main body.

Figure 4:
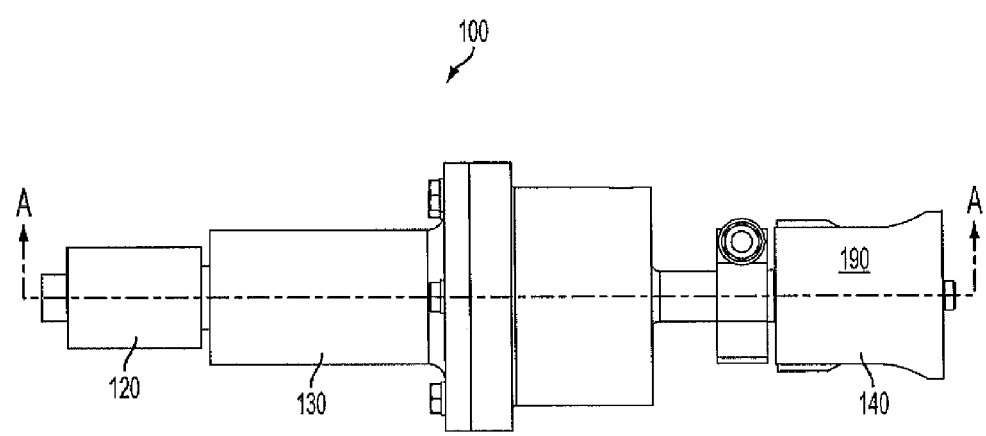
FIG. 4 illustrates a front view of a pneumatic pinch valve in accordance with certain aspects of the present invention.
Figure 5A:
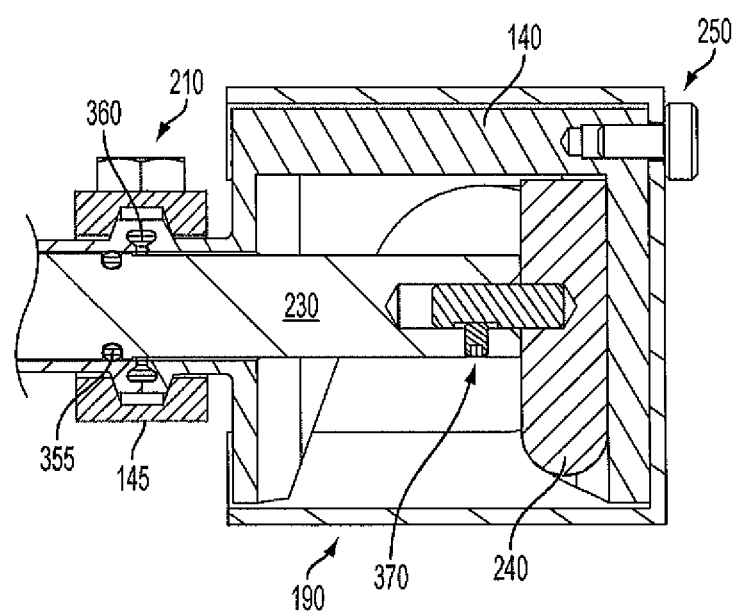
FIG. 5A illustrates a partial sectional view of the pneumatic pinch valve shown in FIG. 4 in the closed position in accordance with certain aspects of the present invention.

The plunger 240 is designed as a cylindrical bar having a smooth rounded surface and a diameter that is the same as or wider than the outer diameter of the tubing to be compressed by the pinch valve 100 of the present invention (FIGS. 3A and 3B show the plunger 240 from an end perspective). The surface 390 of the headpiece against which the plunger 240 resides when in the closed or resting state is configured to accept the plunger. That is, the surface 390 may have a concave shape which receives the convex shape of the plunger 240. FIG. 5A shows a partial sectional view of the pinch valve 100 in the closed position taken along line A-A as shown in FIG. 4. The plunger 240 is rotated 90° relative to the view in FIG. 3A, and can be seen to have a diameter that is similar to the diameter of the headpiece 140. From the perspective of FIG. 5A, the tubing would be coming out of the page.

Also shown in FIG. 5A are the clamp 145, screw 210 and gasket 360 which provide for secure attachment of the headpiece 140 to the main body (via part 135 as shown in FIG. 3A). The set screw 370 which may be used to attach the plunger 240 to the second piston rod end 230, as well as the piston rod gasket 355 are shown. The first safety cap 190 is shown to cover the headpiece 140, and may be securely attached to the headpiece by a screw 250.

Figure 5B:
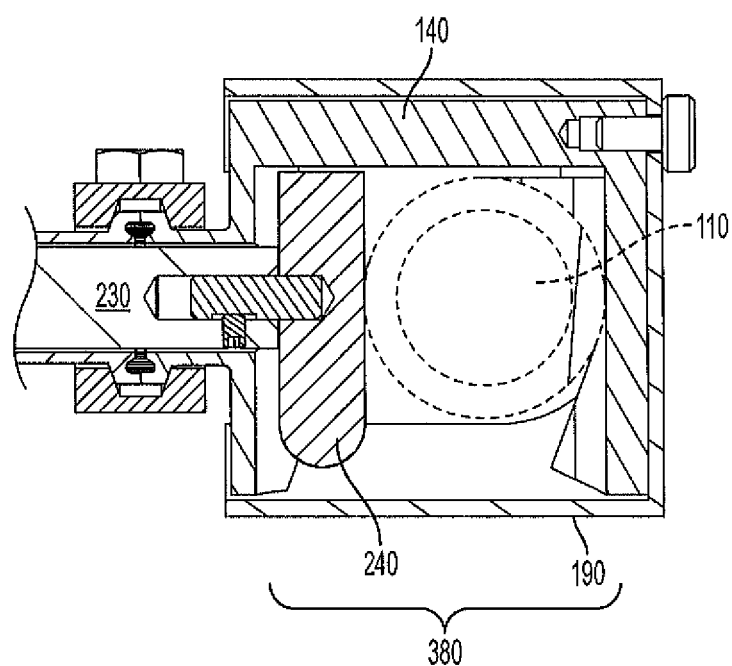
FIG. 5B illustrates a partial sectional view of the pneumatic pinch valve shown in FIG. 4 in the open position in accordance with certain aspects of the present invention including a compressible tubing.

FIG. 5B shows a partial sectional view of the pinch valve 100 in the open position taken along line A-A as shown in FIG. 4. The plunger 240 (attached to the second piston rod end 230) is pulled away from the surface 390 of the headpiece 140 and a section of compressible tubing 110 is shown in the headpiece slot 380. From the perspective of FIG. 5B, the tubing would be coming out of the page.

Figure 6A:
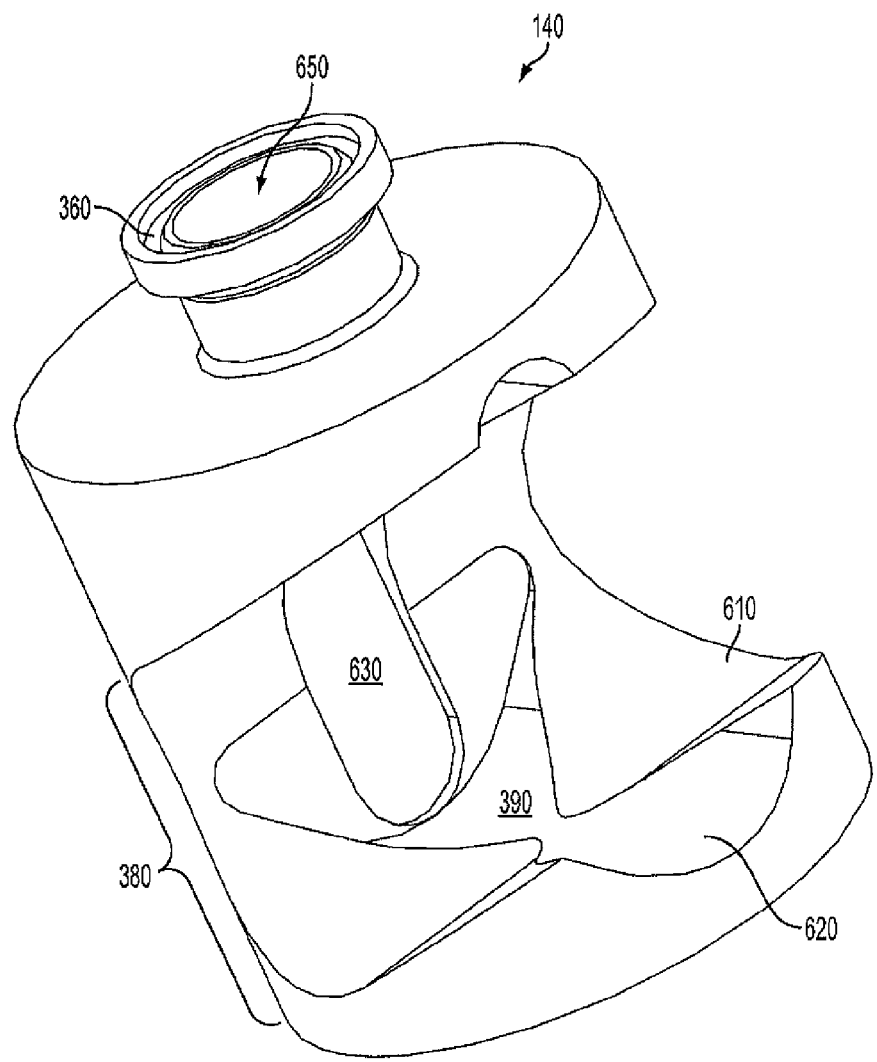
FIG. 6A illustrates a three dimensional perspective view of a pneumatic pinch valve headpiece in accordance with certain aspects of the present invention.

A three dimensional perspective view of the headpiece 140 is shown in FIG. 6A. The slot 380 in the headpiece 140 which may receive a portion of flexible, compressible tubing is shown, as well as a port 650 through which the piston rod is slideably received, and a location for the gasket 360. In the embodiment shown in FIG. 6A, the plunger 240 may be attached to the second piston rod end 230 by at least one set screw 370 so that the plunger may be removed in the event that the headpiece 140 needs to be removed. Also within the scope of the present invention are alternate configurations for the headpiece 140 which may allow the plunger 240 to be integral to the second piston rod end 230 such as, for example, a wider port 650.

In certain embodiments of the pinch valve, the headpiece surface 390 may be contoured. As shown in FIG. 6A, the surface 390 may have two concave depressions (610, 620): a first concave depression 610 configured to receive the compressible tubing and a second concave depression 620 configured to receive the plunger 240. While these depressions are shown to be concentric and perpendicular to one another, other arrangements are within the scope of the present invention. A groove 630 is shown in the headpiece 140 which may receive an end of the plunger 240 and may act to hold the plunger in a set position within the headpiece slot 380. That is, the groove 630 may keep the plunger 240 from rotating within the headpiece slot 380 so that the plunger is directed to come to a resting position on the second concave depression 620. Recall also that the piston rod 300 may comprise a square portion which may fit through an opening at the end of the main body part 130 and may further aid in holding the plunger 240 in a specific orientation with respect to the headpiece 140 and the second concave depression 620.

Figure 6B:
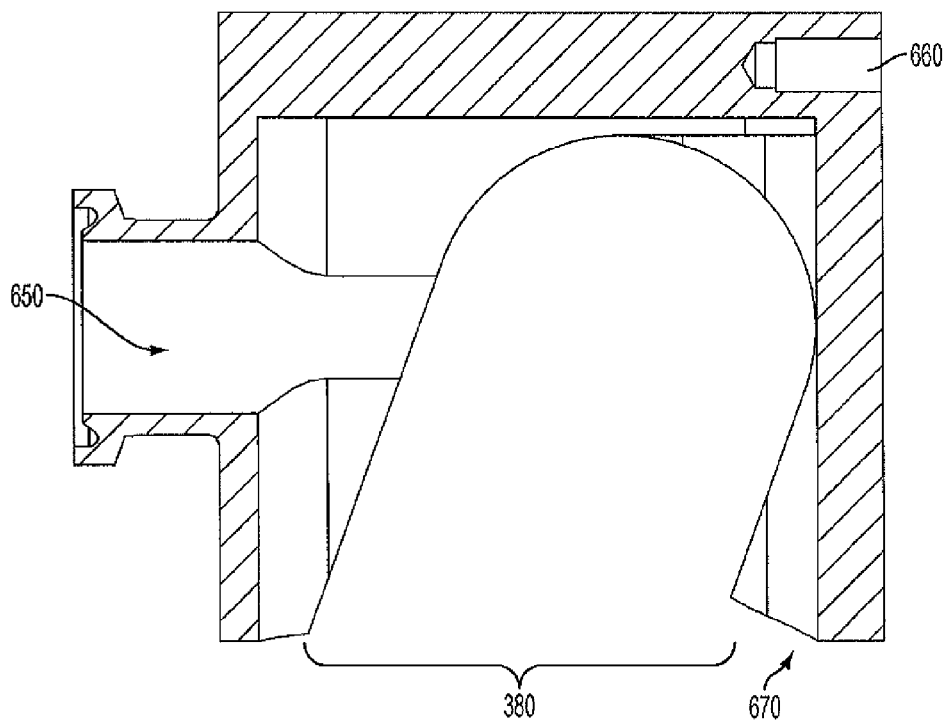
FIG. 6B illustrates a sectional view of a pneumatic pinch valve headpiece in accordance with certain aspects of the present invention.

In combination with the round smooth shape of the plunger 240, the contoured surface 390 of the headpiece slot 380 may provide for reduced or no damage to the tubing over the course of multiple open/close cycles as there are no sharp edges that would crease or bend the tubing. Furthermore, the contours provided by the first concave depression 610 may hold the portion of flexible tubing in the headpiece slot 380 without the need for additional clasps or closures. As shown in FIG. 6B, the contoured surface of the headpiece slot 380 may provide a rim or raised edge 670 which may hold the tubing within the headpiece 140. As such, the pinch valve of the present invention may be integrated into an existing system without the need to break any connections.

Figure 7:
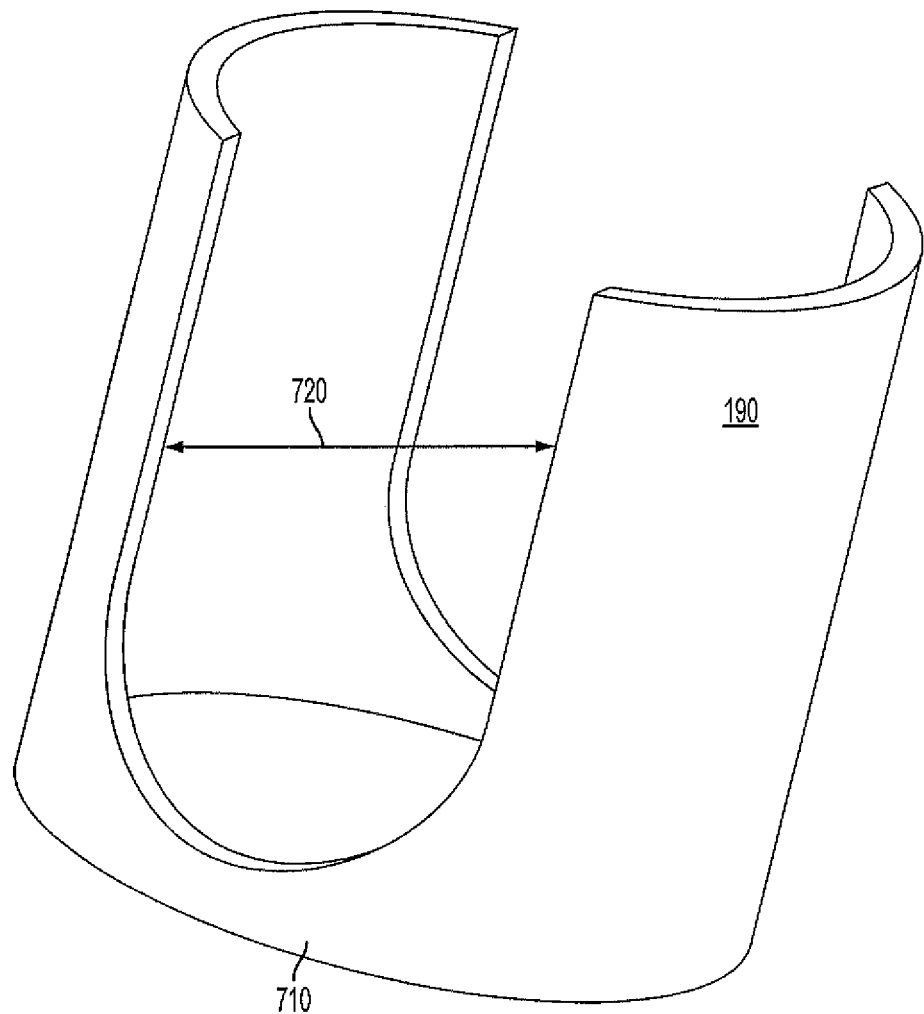
FIG. 7 illustrates a perspective view of a safety cap for a pneumatic pinch valve headpiece in accordance with certain aspects of the present invention.

Shown in FIG. 7 is a three dimensional perspective view of an embodiment of the first safety cap 190 according to the present invention. The first safety cap 190 may be installed over the headpiece, and is rotatable so that the opening 720 may align with or cover the headpiece slot. The first safety cap 190 provides a means to deter or restrict access to the headpiece slot and thus protect a user or other equipment from being pinched by the plunger when the pinch valve is in use. Once installed, the first safety cap may be held in position by a screw, such as a thumb screw, which may be received by a hole in the top of the first safety cap 710 and an aligned hole in the headpiece (660 in FIG. 6B). In one embodiment of the first safety cap 190 for the pinch valve 100 of the present invention, there may be two holes in the top 710 which may allow a thumb screw to hold the first safety cap 190 in either of an open or closed position. That is, either hole may be aligned with the hole 660 in the headpiece 140 so that the first safety cap 190 is either open or closed, and a thumb screw may be inserted to hold the cap in that position and securely attached to the headpiece 140.

A second safety cap or sheath (not shown) may be installed over a portion of the main body (130, 135) which may restrict access to the piston rod 300 and all or a portion of the manual override handle 120. As shown in FIG. 3B, air or another gas injected to the pneumatic chamber causes the piston rod 300 to move into the open position (piston plate 340 pushed against the stop point 342) such that a portion of the piston rod 300 is exposed. As shown in FIG. 3A, when air is released from the pneumatic chamber the piston rod 300 is moved back into the closed position (piston plate 340 pushed against the second end of the central cavity 335) such that the piston rod is enclosed within the main body. Movement of the piston rod 300 represents a pinch point where a user's fingers or other equipment may be squeezed or pinched when the pinch valve 100 is in use. The second safety cap may be attached to a portion of the main body such as, for example, on main body part 130, and may cover the piston rod 300 during operation. Further, the second safety cap may cover all or a portion of the manual override handle 120 when the pinch valve 100 is closed or may cover all or a portion of the manual override handle in both the open and closed position of the pinch valve. While the second safety cap has been discussed in terms of a detachable cover or sheath which may restrict access to the piston rod 300 during operation of the pinch valve 100 of the present invention, other configurations are within the scope of the present invention. For example, the main body part 130 may be configured to have an integral extended portion which may cover the piston rod 300 and all or a portion of the manual override handle 120 during operation. Alternatively, the manual override handle 120 may be configured to have an integral extended portion which may cover the piston rod 300 and all or a portion of the main body (130, 135) during operation.

Also shown in FIG. 3B is the air inlet port 180, which is in fluid communication with the pneumatic chamber (region defined by the second end of the central cavity 335 and the stop point 342), and the plunger 240, which is in the open position (pulled away from contoured surface 390).

Figure 8:
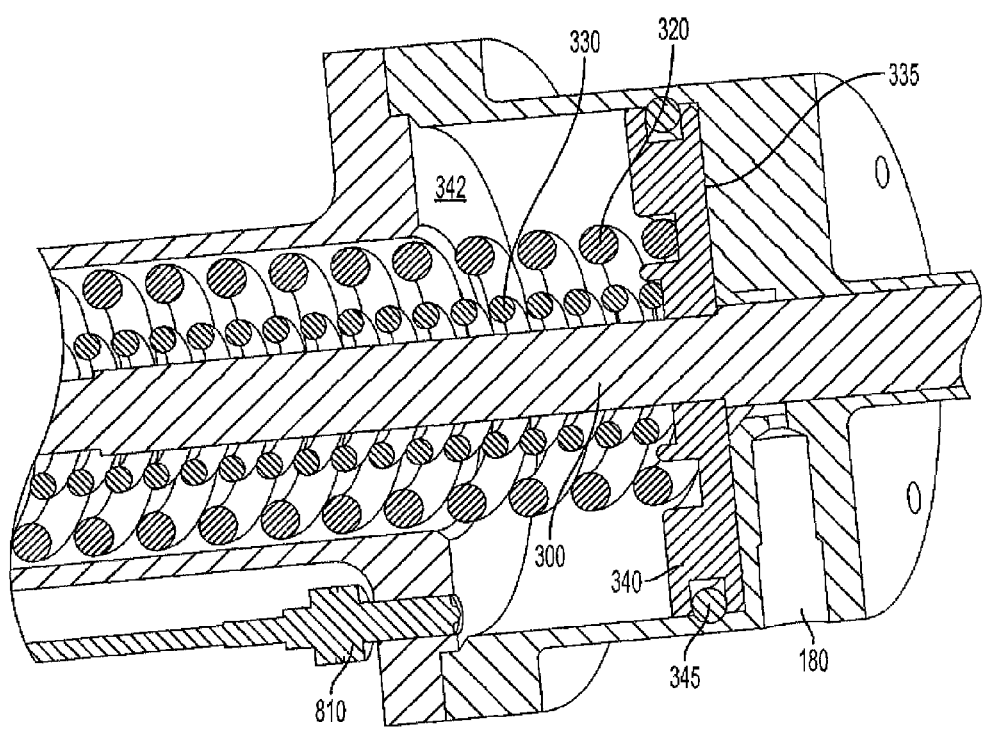
FIG. 8 illustrates a partial sectional view of the pneumatic pinch valve shown in FIG. 2 in accordance with certain aspects of the present invention.

Control of the pinch valve of the present invention may be affected by various switches and solenoid valves. As mentioned above, a solenoid valve may be connected to the air inlet port (180 in FIGS. 2, 3A and 3B) so that the flow of air or other gas from a pump or other gas supply into the pneumatic chamber is controlled. As such, opening and closing of the pinch valve is controlled. Moreover, limit switches may be used to determine an open or closed state of the pinch valve. As shown in FIG. 8, a port for a limit switch 810 may be provided in the main body of the pinch valve. In the embodiment shown, the limit switch 810 may be a mechanical limit switch which may be able to detect a position of the piston plate 340 within the main body cavity. As depicted, the piston plate 340 is in a closed or resting state against the second cavity end 335. When air or another gas is injected through the air inlet port 180, the piston plate is pushed against the stop point 342 (open position) and triggers the limit switch 810. Responses from various sensors or limit switches may be used to monitor or further control the pinch valve of the present invention. The springs (320, 330), piston plate gasket 345, and piston rod 300 are shown in FIG. 8 for reference.

The pinch valve of the present invention provides many advantages over the prior art. The system disclosed herein remains in the closed position unless actuated. Thus, in the event of a failure of gas pressure (loss of electric power, loss of air supply), the pneumatic chamber will empty and the plunger will come to rest in the closed position on the compressible tubing. As such, the pinch valve may stop system operation and provide increased safety for certain operations. Further, with the present pinch valve construction, control of flow within a system is both rapid and precise, with no dripping or loss of fluid after the tubing is closed by the valve (see Example). Moreover, the unique design of the contoured surface of the headpiece and the plunger afford thousands of successive and successful repeated actuations of the valve on the same tube without failure (leaking or damage to the tubing). With the pinch valve of the present invention, the possibility of tube failure can be even further minimized by periodically, for example during scheduled maintenance periods, slightly longitudinally moving the flexible, compressible tube within the headpiece slot, thereby varying the precise point of tube compression.

The pinch valve of the present invention also includes a first safety cap which fits over the headpiece and a second safety cap which fits over a portion of the main body. These safety features may protect a user's fingers during installation and use of the pinch valve. The safety caps may additionally provide protection for other tubing or wires that may be in proximity to the headpiece while the pinch valve is in use. The first safety cap may be rotated to an open position which allows access to the plunger when a tube is not installed, or may be removed to allow installation of a tube within the headpiece. The pinch valve of the present invention may be used in any orientation, and installation of the first safety cap over the headpiece may help to stabilize the tubing in the headpiece slot when the valve is placed in certain orientations or in the instance that the tubing is bumped or moved when the valve is in the open position.

Switches or sensors may be easily added to the pinch valve which may be used to detect a state of the system, control the flow rate, open or close the valve, and allow the pinch valve to be integrated into a larger automated System. The unique design of the headpiece allows a compressible tubing to be installed within the headpiece slot without breaking any connections. Thus, the pinch valve can be added to or removed from a system which is already in operation, reducing the downtime for an operation and eliminating the risk of contamination for sterile operations. Moreover, the headpiece design allows for a fully open flow path when the valve is in the open position as there is no bending, pinching or deformation of the tubing within the headpiece slot.

Finally, components of the pinch valve can be constructed from a variety of metallic, plastic or composite materials. Thus, individual components or the entire pinch valve may be autoclavable, allowing for use in a sterile environment. However, as the pinch valve is installed over existing tubing in a system, sterility may be maintained within the tubing without the need to autoclave the pinch valve as no connections or tubing needs to be cut.

Figure 9:
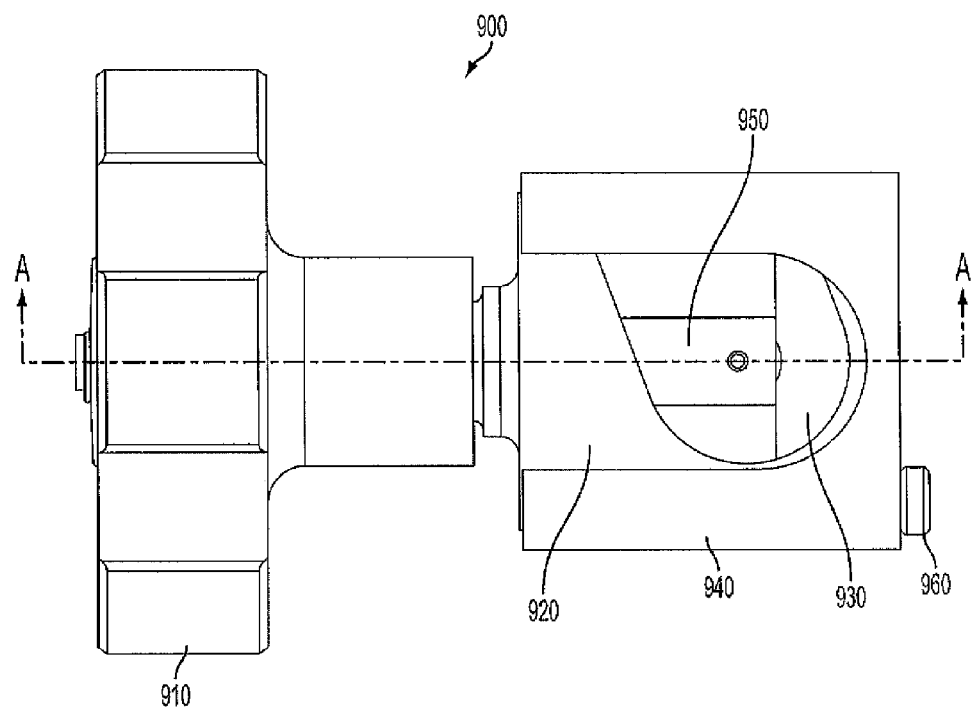
FIG. 9 illustrates a front view of a manual pinch valve in accordance with certain aspects of the present invention.
Figure 10:
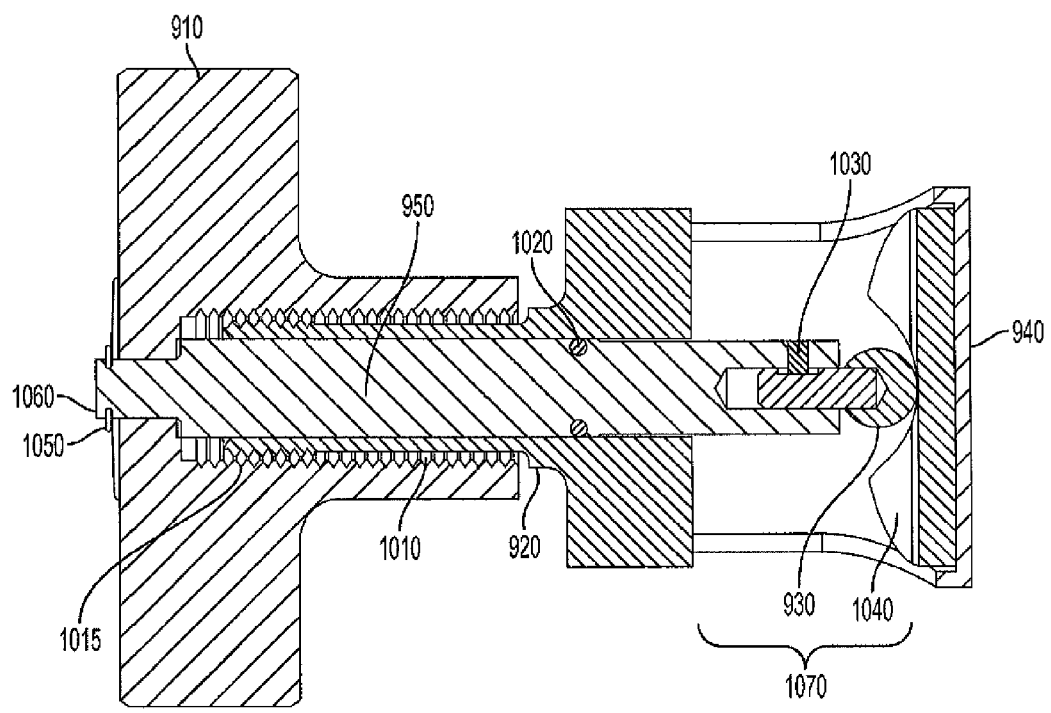
FIG. 10 illustrates a sectional view of the manual pinch valve shown in FIG. 9 in accordance with certain aspects of the present invention.
Figure 11:
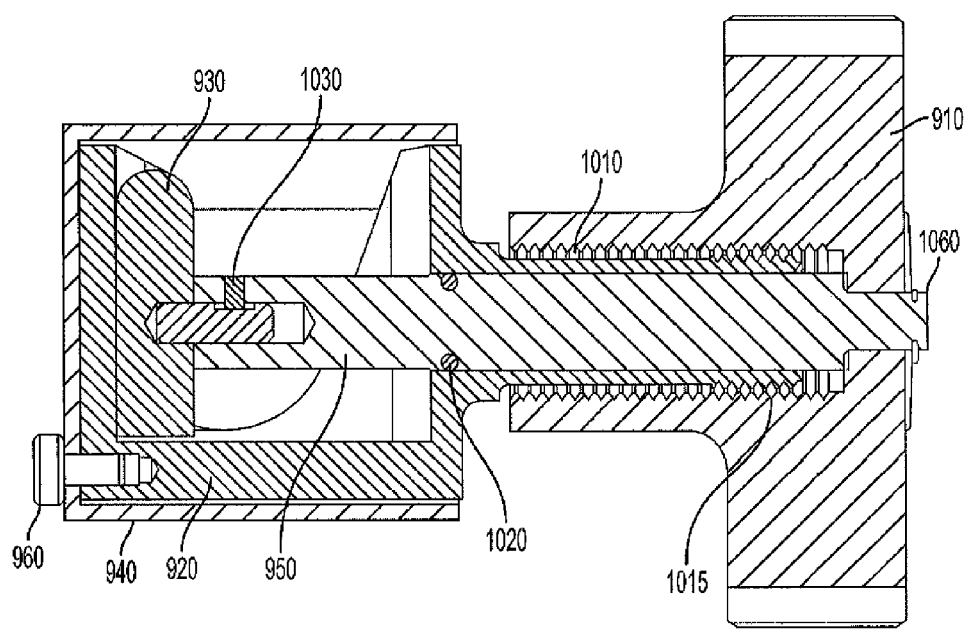
FIG. 11 illustrates a sectional view of the manual pinch valve shown in FIG. 9 rotated 90° in accordance with certain aspects of the present invention.

The present invention also includes a manual version of the pinch valve. Shown in FIGS. 9-11 is a manual pinch valve generally designated by the reference numeral 900. As shown in FIG. 9, the pinch valve 900 includes a handle 910, a main body 920, a plunger 930, a safety cap 940, and a piston rod 950. The safety cap may be secured by a bolt or screw 960. From the perspective shown in this figure, the tubing would be coming out of the page. The plunger 930 is shown in the closed position within the main body 920, and the safety cap 940 is in a closed position which limits or blocks access to the plunger 930.

FIG. 10 illustrates a sectional view of the manual pinch valve taken along line A-A as shown in FIG. 9. Shown for reference are the handle 910 and safety cap 940. The main body 920 has a lateral internal bore through which the piston rod 950 is slideably mounted. The main body 920 further comprises a tubing slot 1070 configured to receive a portion of flexible, compressible tubing. The tubing slot 1070 may have a contoured surface 1040 against which the plunger 930 rests when the manual pinch valve 900 is in the closed position. The contoured surface 1040 may be configured in the same manner as is shown in FIGS. 6A and 6B (390), with two concave depressions which receive the compressible tubing and the plunger 930. As described above, these depressions may be concentric and perpendicular to one another, or may have other configurations which are within the scope of the present invention. Further, a groove may be included which may receive an end of the plunger 930 and may act to hold the plunger in a set position within the tubing slot 1070 in much the same manner as shown in FIG. 6A (slot 630). That is, the groove may keep the plunger 930 from rotating within the tubing slot 1070 so that the plunger is directed to come to a resting position on one of the concave depressions of the contoured surface 1040.

The piston rod 950, which is slideably mounted within the main body 920, has a first and second end. The plunger 930 may be integral to the second rod end or may be removeably attached by at least one set screw 1030. The first end of the piston rod 1060 may have a means for attachment to the handle 910. Such attachment may provide a secure connection that allows for separate rotation of the handle 910 and the piston rod 950 such as, for example, a retaining ring and/or clips 1050. The handle 910 is shown to have an internal bore with a thread 1010 which matches an external thread 1015 on an end of the main body 920. Treaded rotation of the handle 910 on the main body 920 may pull the piston rod 950 through the internal bore of the main body, thus pulling the plunger 930 away from the contoured surface 1040 of the tubing slot 1070, placing the manual pinch valve 900 in an open position. The handle 910 may be used to open the manual pinch valve 900 as described, may close the valve to stop flow of fluid through a flexible tubing installed within the tubing slot 1070, or may be used to provide partial flow through the tubing.

As described above, the contoured surface 1040 in combination with the round smooth shape of the plunger 930 may provide for reduced or no damage to the tubing over the course of multiple open/close cycles as there are no sharp edges that would crease or bend the tubing. Furthermore, the contours provided by the concave depression of the contoured surface 1040 holds the flexible tubing in the tubing slot 1070 without the need for additional clasps or closures. As shown in FIG. 10, the contoured surface 1040 of the tubing slot 1070 may provide a rim or raised edge which may hold the tubing within the main body 920. As such, the manual pinch valve 900 of the present invention may be integrated into an existing system without the need to break any connections.

FIG. 11 illustrates a sectional view of the manual pinch valve taken along line A-A as shown in FIG. 9 and rotated 90° in the vertical plane of the page (the image is also flipped 180° in the horizontal plane of the page). The handle 910, main body 920, piston rod 950, plunger 930 and set screw 1030, safety cap 940, and safety cap attachment means 960 are shown for reference. The first piston rod end 1060, and threaded surfaces of the main body 1015 and the handle 1010 are also pointed out. The plunger 930 is shown at an angle 90° from the view in FIG. 10, illustrating the design as a cylindrical bar having a smooth rounded surface and a diameter that is the same as or wider than the outer diameter of the tubing to be compressed by the manual pinch valve 900 of the present invention.

Also shown in FIGS. 10 and 11 is the gasket 1020, which may provide a smooth sliding fit between the piston rod 950 and the main body 920. Such may help to maintain a desired position for the piston rod 950 within the main body 920 and thus within the contoured surface 1040.

The previous description is provided to enable any person skilled in the art to practice the various exemplary implementations described herein. Various modifications to these variations will be readily apparent to those skilled in the art, and the generic principles defined herein may be applied to other implementations. All structural and functional equivalents to the elements of the various illustrious examples described throughout this disclosure that are known or later come to be known to those of ordinary skill in the art are expressly incorporated herein by reference.

EXAMPLE

An embodiment of the pneumatic pinch valve of the present invention was tested on an automated test system to verify that the pinch valve can achieve complete shutoff of a flexible tube carrying fluids of varied temperature at elevated pressures after a large number of on/off cycles.

The test equipment included: an Allen Bradley Pico™ programmable logic controller (Pico 1760-L-12AWA); Asco electric solenoid valves, actuated by 60 psig instrument air supply; Anderson pressure indicators, 0-100 psig and 0-60 psig (BPI-0046 and BPI-0066); piping components (miscellaneous ½" and 1" hose, clamps, gaskets); a chiller (BPI-0001); an ITT standard steam heat exchanger, part no. SN516003008006 (shell max pressure 225 psig/max temperature 450° F., tube max pressure 150 psig/max temperature 450° F.); and an Almatec air-operated diaphragm pump, pump type A10TTT, serial no. 561879. The tubing used in the testing was Saint Gobain Sani-Tech® STHT®-R platinum-cured braid-reinforced silicone hose, ½" hose (part number STHT-R-0500, ⅞" O.D., lot 523229) or 1" hose (part number STHT-R-1000, 1⅜" O.D., lot 493292).

A testing system was designed using the above equipment which could test pinch valves of the present invention that were manufactured with two different headpieces capable of receiving either ⅞" O.D. or 1⅜" O.D. tubing. The testing system was controlled by the Allen Bradley Pico™ Programmable Logic Controller which switched the Asco electric solenoid valves between the compressed air source (60 psi) and atmospheric vent to the pinch valves, which were connected via pneumatic tubing to the instrument air source. An Almatec Air-Operated Diaphragm Pump was used to generate 5 barG (72.5 psi) of pressure within the Sani-Tech® STHT®-R hose that was used within the pinch valves. The ITT standard steam heat exchanger and chiller were used to provide process water at temperatures of 4° C., 20° C., and 40° C.

To counterbalance the pressure of the air supply (60 psi), and the sizes and compressibility of the tubing used (see above), a set of nested springs capable of supplying 150 psi when the valve is in the closed position and 400 psi when the valve is in the open position were used for this testing.

The pinch valves of the present invention were tested in 250 pulse cycle increments to 1,000 pulse cycles with flowing water in a closed loop system at varied temperatures (4° C., 20° C., and 40° C.). Acceptance criteria for testing are listed in Table 1 with a summary of results in Table 2 and raw data in Tables 3, 4 and 5. For all test conditions, the pinch valves of the present invention achieved complete shutoff after 1000 on/off cycles against water at 5 barG (72.5 psig) at the three water temperatures tested. Additionally, two leakage tests were performed at interim 250 cycle points and results showed that with upstream pressure at 5 barG there was no hydraulic pressure change (specifically, there was no increase to analog pressure indicators) after one minute on any of the tests. In some instances, pressures fell by 0.5 psig. At the end of three runs at the set temperature at the 5 barG pressure, the outlet side of the hose was cut to confirm dryness. Visual inspection of the house outlet using tissue paper after one minute confirmed that there was no leakage through the closed valve. Additionally, both the interior and exterior of the hose met acceptance criteria.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

TABLE 1

Summary of Acceptance Criteria

| Acceptance Criteria | Acceptable | Undesirable | Unacceptable |
| --- | --- | --- | --- |
| Condition of Pinch Valve Hose Exterior | Discoloration, exterior compression marks, minor deformation, non-penetrated surface cuts, adhesion, no residue | Adhesion, residue inside valve body, severe deformation, erosion, exterior cuts | Fully-penetrated exterior cuts, delamination, peeling, integrity compromise |
| Hydraulic Pressure Change after Pinch Valve Closure (1 min) | No Downstream Pressure Increase | | Downstream Pressure Increase |
| Visual Inspection of Hose Outlet after Pinch Valve closure (1 min) | No Leakage | | |

TABLE 2

Summary of Test Results

| Acceptance Criteria | Acceptable |
| --- | --- |
| Condition of Pinch Valve Hose Exterior | Superficial, cosmetic exterior depressions were formed from the pinching of the hose; an area of black discoloration formed from friction with the sidewall of the pinch valve. |
| Hydraulic Pressure Change after Pinch Valve Closure (1 min) | There was no increase of pressure on the downstream side of the pulse valves with 5 barG on the upstream side during the one-minute pressure test. |
| Visual Inspection of Hose Outlet after Pinch Valve closure (1 min) | No leakage to tissue inserted on downstream side of cut hose after one-minute pressure test. |

TABLE 3

Test results - 4° C. process water

| Run # | Cycles | T (° C.) | P (psig) | Pressure Decay Test (ΔP, psig) | |
| --- | --- | --- | --- | --- | --- |
| | | | | ½ Inch Hose | 1 Inch Hose |
| 1 | 1-250 | 7.9 | 73.5 | 0.0 | 0.0 |
| | 250-500 | 7.5 | 73.5 | 0.0 | 0.0 |
| | 500-750 | 4.3 | 73.5 | 0.0 | 0.0 |
| | 750-1000 | 4.7 | 73.5 | 0.0 | 0.0 |
| 2 | 1-250 | 5.6 | 73.5 | 0.0 | 0.0 |
| | 250-500 | 2.9 | 73.5 | −0.5 | 0.0 |
| | 500-750 | 3.0 | 73.5 | 0.0 | 0.0 |
| | 750-1000 | 3.8 | 74.0 | 0.0 | 0.0 |
| 3 | 1-250 | 5.8 | 73.4 | 0.0 | 0.0 |
| | 250-500 | 3.0 | 73.0 | 0.0 | 0.0 |
| | 500-750 | 3.0 | 73.0 | 0.0 | 0.0 |
| | 750-1000 | 4.3 | 73.0 | 0.0 | 0.0 |
| | AVG | 4.6 | 73.4 | 0.0 | 0.0 |
| Cut outlet hose | | 5.0 | 73.0 | Pressure test passed with no leakage to tissue paper inserted to downstream side of closed pinch valve. | |

TABLE 4

Test results - 20° C. process water

| Run # | Cycles | T (° C.) | P (psig) | Pressure Decay Test (ΔP, psig) ½ Inch Hose | Pressure Decay Test (ΔP, psig) 1 Inch Hose |
|---|---|---|---|---|---|
| 1 | 1-250 | 11.0 | 72.5 | 0.0 | 0.0 |
|  | 250-500 | 11.0 | 74.0 | −1.0 | 0.0 |
|  | 500-750 | 11.0 | 73.5 | 0.0 | 0.0 |
|  | 750-1000 | 11.0 | 73.0 | 0.0 | 0.0 |
| 2 | 1-250 | 11.3 | 74.0 | 0.0 | 0.0 |
|  | 250-500 | 11.5 | 74.0 | 0.0 | 0.0 |
|  | 500-750 | 11.7 | 74.0 | 0.0 | 0.0 |
|  | 750-1000 | 12.0 | 74.0 | 0.0 | 0.0 |
| 3* | 1-250 | 34.0 | 74.0 | 0.0 | 0.0 |
|  | 250-500 | 29.0 | 73.5 | 0.0 | 0.0 |
|  | 500-750 | 25.5 | 74.0 | 0.0 | 0.0 |
|  | 750-1000 | 23.0 | 74.0 | 0.0 | 0.0 |
|  | AVG | 16.8 | 73.7 | −0.1 | 0.0 |
|  | Cut outlet hose | 16.0 | 73.0 | Pressure test passed with no leakage to tissue paper inserted to downstream side of closed pinch valve. | |

*Run 3 of the ambient temperature test was performed at an elevated temperature of 34° C. to achieve a closer match to the desired ambient temperature of 20° C.

TABLE 5

Test results - 40° C. process water

| Run # | Cycles | T (° C.) | P (psig) | Pressure Decay Test (ΔP, psig) ½ Inch Hose | Pressure Decay Test (ΔP, psig) 1 Inch Hose |
|---|---|---|---|---|---|
| 1 | 1-250 | 44.0 | 73.0 | 0.0 | 0.0 |
|  | 250-500 | 37.6 | 73.3 | −0.5 | 0.0 |
|  | 500-750 | 40.4 | 74.0 | 0.0 | 0.0 |
|  | 750-1000 | 43.2 | 74.0 | 0.0 | 0.0 |
| 2 | 1-250 | 40.2 | 74.0 | −0.5 | 0.0 |
|  | 250-500 | 40.7 | 74.0 | −0.5 | 0.0 |
|  | 500-750 | 40.2 | 74.0 | −0.5 | 0.0 |
|  | 750-1000 | 42.2 | 74.0 | 0.0 | 0.0 |
| 3 | 1-250 | 40.1 | 74.0 | −0.5 | 0.0 |
|  | 250-500 | 43.0 | 74.0 | −0.5 | 0.0 |
|  | 500-750 | 46.3 | 74.0 | −0.5 | 0.0 |
|  | 750-1000 | 42.3 | 74.0 | −0.5 | 0.0 |
|  | AVG | 41.7 | 73.9 | −0.3 | 0.0 |
|  | Cut outlet hose | 42.0 | 74.0 | Pressure test passed with no leakage to tissue paper inserted to downstream side of closed pinch valve. | |

What is claimed is:

1. A pneumatic pinch valve for compressing tubing formed of compressible material, the pinch valve comprising:
   a housing comprising:
      a pneumatic chamber which contains a piston rod having a first piston rod end, a second piston rod end, a piston plate disposed about a middle portion of the piston rod, and a plunger disposed at the first piston rod end, and
      at least one spring; and
   a headpiece having a first headpiece end, a second headpiece end, and a headpiece slot for receiving a portion of tubing formed of compressible material, wherein the first headpiece end is removeably attached to the housing so that the plunger resides within the headpiece slot, the headpiece slot including a headpiece surface at the second headpiece end against which the portion of tubing is compressed by the plunger when in a closed position,
   wherein the at least one spring urges the plunger into the closed position by exerting a force on the piston plate and a gas injected into the pneumatic chamber urges the plunger into an open position by exerting an opposing force on the piston plate and compressing the at least one spring to relieve compression of the portion of tubing, and
   wherein the portion of tubing is removeably held in the headpiece slot by the headpiece surface when the plunger is in the open position.

2. The pneumatic pinch valve of claim 1, wherein the headpiece surface is contoured with two concave depressions, wherein one concave depression receives the plunger and the other concave depression receives the portion of tubing.

3. The pneumatic pinch valve of claim 1, wherein the headpiece surface is contoured with two concentric concave depressions which are perpendicular to one another, wherein one concave depression receives the plunger and the other concave depression receives the portion of tubing.

4. The pneumatic pinch valve of claim 1, wherein the piston plunger has a smooth rounded surface which contacts the headpiece surface and a diameter substantially the same as the diameter of the headpiece surface.

5. The pneumatic pinch valve of claim 1, wherein the headpiece is removeably attached to the housing by a clamp.

6. The pneumatic pinch valve of claim 1, further comprising:
   a manual override handle rotatably attachable to the second piston rod end by an internally threaded bore, the second piston rod end comprising a matching screw thread,
   wherein rotation of the manual override handle on the second piston rod end compresses the at least one spring urging the plunger into the open position.

7. The pneumatic pinch valve of claim 1, further comprising:
   a first safety cap securable over the headpiece,
   wherein a closed position of the first safety cap deters access to the headpiece slot.

8. The pneumatic pinch valve of claim 7, wherein the first safety cap is rotatable to an open position which allows access to the headpiece slot.

9. The pneumatic pinch valve of claim 1, further comprising:
   a second safety cap securable over at least part of the housing,
   wherein the second safety cap restricts access to the piston rod.

10. The pneumatic pinch valve of claim 1, wherein the housing further comprises a port for a limit switch which detects a position of the plunger.

11. The pneumatic pinch valve of claim 1, wherein the housing is constructed of two parts that are detachable to allow access to the at least one spring.

12. The pneumatic pinch valve of claim 1, wherein the at least one spring is a set of nested springs.

13. A pneumatic pinch valve for tubing formed of compressible material, the pinch valve comprising:
   a main body having a first main body end, a second main body end, a lateral bore, and a laterally extending main body cavity, wherein the main body cavity comprises a first cavity end and a second cavity end, and the main body comprises an air inlet port disposed proximate to the second cavity end of the main body cavity;
   a piston rod having a first rod end and a second rod end, wherein the piston rod comprises a piston plate disposed about a middle portion of the piston rod and a piston plunger disposed at the second rod end, wherein the piston rod is slidably mounted within the main body cavity so that the piston plate forms a pneumatic chamber therein and the piston plunger extends beyond the second main body end;

at least one spring disposed within the main body cavity and positioned between the first main body cavity end and the piston plate to bias the piston plate into a closed position against the second main body cavity end; and a headpiece having a headpiece slot for receiving a portion of tubing formed of compressible material, wherein the headpiece is removeably attached to the second main body end so that the piston plunger resides within the headpiece slot, the headpiece slot including a headpiece surface against which the portion of tubing is compressed by the piston plunger when the piston plate is in the closed position, wherein a gas injected through the air inlet port into the pneumatic chamber pushes the piston plate into an open position by compressing the at least one spring and relieving compression of the portion of tubing to restore the portion of tubing to an open condition.

14. The pneumatic pinch valve of claim 13, wherein the piston plunger has a smooth rounded surface which contacts the headpiece surface and a diameter substantially the same as the diameter of the headpiece surface.

15. The pneumatic pinch valve of claim 13, wherein the headpiece surface is contoured with two concentric concave depressions which are perpendicular to one another, wherein one concave depression receives the piston plunger and the other concave depression receives the portion of tubing.

16. The pneumatic pinch valve of claim 13, further comprising:
a manual override handle rotatably attachable to the first rod end by an internally threaded bore, the first rod end comprising a matching screw thread,
wherein rotation of the manual override handle on the first rod end compresses the at least one spring urging the piston plate into the open position.

17. The pneumatic pinch valve of claim 13, further comprising:
a first safety cap securable over the headpiece,
wherein a closed position of the first safety cap deters access to the headpiece slot.

18. The pneumatic pinch valve of claim 13, wherein the piston plate and piston rod additionally comprise gaskets configured to provide an air tight seal within the main body cavity.

19. The pneumatic pinch valve of claim 13, further comprising:
a second safety cap securable over at least part of the main body,
wherein the second safety cap restricts access to the piston rod.

20. A pinch valve for tubing formed of compressible material, the pinch valve comprising:
a main body having a laterally extending main body cavity and a transverse tube holding slot for receiving a portion of tubing formed of compressible material;
a piston rod having a first piston rod end and a second piston rod end, wherein the first piston rod end comprises a plunger and the piston rod is slidably mounted within the main body cavity so that the plunger extends into the tube holding slot; and
a handle rotatably attachable to the main body at an end opposite from the tube holding slot, the handle having an internally threaded bore which matches an external thread on the main body end, wherein the second piston rod end comprises a means for attachment to the handle which allows the handle to rotate while the plunger remains in a specific orientation,
wherein rotation of the handle urges the plunger toward or away from a contoured surface of the tube holding slot thereby compressing or decompressing the tubing.

21. The pinch valve of claim 20, wherein the plunger has a smooth rounded surface which contacts the contoured surface of the tube holding slot and a diameter substantially the same as the diameter of the contoured surface.

22. The pinch valve of claim 20, wherein the contoured surface of the tube holding slot is contoured with two concentric concave depressions which are perpendicular to one another, wherein one concave depression receives the plunger and the other concave depression receives the portion of tubing.

23. The pinch valve of claim 20, wherein the means for attachment of the second piston rod end to the handle includes a retaining ring and/or clips.

* * * * *